United States Patent
Faccin et al.

(10) Patent No.: US 11,160,014 B2
(45) Date of Patent: Oct. 26, 2021

(54) CONNECTION GATEWAY SELECTION IN A MOBILE COMMUNICATIONS DEVICE

(71) Applicant: QUALCOMM Incorporated, San Diego, CA (US)

(72) Inventors: Stefano Faccin, San Ysidro, CA (US); Suli Zhao, San Diego, CA (US); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 16/157,973

(22) Filed: Oct. 11, 2018

(65) Prior Publication Data
US 2019/0116551 A1    Apr. 18, 2019

Related U.S. Application Data

(60) Provisional application No. 62/573,074, filed on Oct. 16, 2017.

(51) Int. Cl.
*H04L 29/06* (2006.01)
*H04W 48/18* (2009.01)
(Continued)

(52) U.S. Cl.
CPC ........... *H04W 48/18* (2013.01); *H04L 65/102* (2013.01); *H04L 65/103* (2013.01);
(Continued)

(58) Field of Classification Search
CPC ..... H04W 48/17; H04W 48/18; H04W 76/10; H04W 84/042; H04W 88/16; H04L 65/1016; H04L 65/102; H04L 65/103
See application file for complete search history.

(56) References Cited

U.S. PATENT DOCUMENTS 8,135,406 B2 * 3/2012 Wijayanathan ....... H04W 76/25
455/435.2
8,972,550 B2 * 3/2015 Fan .................... G06F 11/2028
709/223
(Continued)

FOREIGN PATENT DOCUMENTS

CN    103222239 A    7/2013
CN    103650550 A    3/2014

OTHER PUBLICATIONS

International Search Report and Written Opinion—PCT/US2018/055571—ISA/EPO—dated Dec. 7, 2018.
(Continued)

*Primary Examiner* — Alpus Hsu
(74) *Attorney, Agent, or Firm* — Arent Fox LLP

(57) ABSTRACT

The present disclosure generally relates to identifying, by a processor of a wireless communications device, a service, determining, by the processor and based at least in part on the service, whether to prioritize a type of connection gateway to utilize in connecting to the service, where the processor determines to prioritize the type of connection gateway, selecting, by the processor, a connection gateway for the service based at least in part on a stored network access preference for the service, where the processor determines not to prioritize the type of connection gateway, selecting, by the processor, the connection gateway for the service regardless of the stored network access preference for the service, and connecting, by the processor, to the service via the connection gateway.

16 Claims, 11 Drawing Sheets

(51) Int. Cl.
*H04W 76/10* (2018.01)
*H04W 48/00* (2009.01)
*H04W 88/16* (2009.01)
*H04W 84/04* (2009.01)

(52) U.S. Cl.
CPC ......... *H04L 65/1016* (2013.01); *H04W 48/17* (2013.01); *H04W 76/10* (2018.02); *H04W 84/042* (2013.01); *H04W 88/16* (2013.01)

(56) References Cited

U.S. PATENT DOCUMENTS

| | | | | |
|---|---|---|---|---|
| 9,439,060 | B2* | 9/2016 | Liu | H04W 8/082 |
| 9,560,517 | B2* | 1/2017 | Keller | H04L 65/40 |
| 9,749,306 | B2* | 8/2017 | Zhu | H04W 12/0602 |
| 10,383,016 | B2* | 8/2019 | Kiss | H04L 45/745 |
| 2007/0232301 | A1* | 10/2007 | Kueh | H04W 8/082 |
| | | | | 455/433 |
| 2011/0235546 | A1 | 9/2011 | Horn et al. | |
| 2011/0310799 | A1 | 12/2011 | Horn et al. | |
| 2014/0133476 | A1 | 5/2014 | Vesterinen et al. | |
| 2015/0110095 | A1* | 4/2015 | Tan | H04W 40/02 |
| | | | | 370/338 |
| 2015/0289159 | A1* | 10/2015 | Jeong | H04W 72/1247 |
| | | | | 370/236 |
| 2017/0223601 | A1 | 8/2017 | Egner et al. | |
| 2017/0332416 | A1* | 11/2017 | Kiss | H04L 61/304 |
| 2019/0158997 | A1* | 5/2019 | Starsinic | H04W 4/70 |

OTHER PUBLICATIONS

Huawei, et al., "UE Initiated Service Request Procedure in Cm Idle State via Untrusted Non-3GPP", Sa WG2 Meeting #120, S2-172017, Mar. 27-31, 2017, Busan, Korea, 3 Pages.

Huawei, et al., "Untrusted N3GPP: Interim Agreements", Sa WG2 Meeting #S2-118, S2-166433, Nov. 14-18, 2016, Reno, Nevada, USA, 4 Pages.

* cited by examiner

CONNECTION GATEWAY SELECTION IN A MOBILE COMMUNICATIONS DEVICE

CLAIM OF PRIORITY UNDER 35 U.S.C. § 119

The present Application for Patent claims priority to Provisional Application No. 62/573,074, entitled "CONNECTIVITY GATEWAY SELECTION IN A MOBILE COMMUNICATIONS DEVICE" filed Oct. 16, 2017, which is assigned to the assignee hereof and hereby expressly incorporated by reference herein for all purposes.

BACKGROUND

Aspects of the present disclosure relate generally to wireless communication networks, and more particularly, to selection of connection gateways by wireless communications devices capable of supporting services on multiple access networks.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current access network selection and handover solutions may not provide a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a method for selecting a connection gateway for a service operating on a wireless communications device is provided. The method includes identifying, by a processor of the wireless communications device, a service, determining, by the processor and based at least in part on the service, whether to prioritize a type of connection gateway to utilize in connecting to the service, where the processor determines to prioritize the type of connection gateway, selecting, by the processor, a connection gateway for the service based at least in part on a stored network access preference for the service, where the processor determines not to prioritize the type of connection gateway, selecting, by the processor, the connection gateway for the service regardless of the stored network access preference for the service, and connecting, by the processor, to the service via the connection gateway.

In another example, an apparatus for wireless communication is provided that includes a transceiver, a memory configured to store instructions, and one or more processors communicatively coupled with the transceiver and the memory. The one or more processors are configured to identify a service, determine, based at least in part on the service, whether to prioritize a type of connection gateway to utilize in connecting to the service, where the one or more processors determine to prioritize the type of connection gateway, select a connection gateway for the service based at least in part on a stored network access preference for the service, where the one or more processors determine not to prioritize the type of connection gateway, select, by the processor, the connection gateway for the service regardless of the stored network access preference for the service, and connect to the service via the connection gateway.

In another example, an apparatus for selecting a connection gateway for a service operating on a wireless communications device is provided. The apparatus includes means for identifying a service, means for determining, based at least in part on the service, whether to prioritize a type of connection gateway to utilize in connecting to the service, means for where the means for determining determines to prioritize the type of connection gateway, selecting a connection gateway for the service based at least in part on a stored network access preference for the service, means for where the means for determining determines not to prioritize the type of connection gateway, selecting the connection gateway for the service regardless of the stored network access preference for the service, and means for connecting to the service via the connection gateway.

In another example, a computer-readable medium, including code executable by one or more processors for selecting a connection gateway for a service operating on a wireless communications device is provided. The code includes code for identifying a service, determining, based at least in part on the service, whether to prioritize a type of connection gateway to utilize in connecting to the service, where the code for determining determines to prioritize the type of connection gateway, selecting a connection gateway for the service based at least in part on a stored network access preference for the service, where the code for determining determines not to prioritize the type of connection gateway, selecting the connection gateway for the service regardless of the stored network access preference for the service, and connecting to the service via the connection gateway.

In an aspect, the present disclosure includes a method for selecting a connection gateway for a service operating on a wireless communications device, including selecting, by a processor of the wireless communications device, a connection gateway for a requesting service operating on the wireless communications device based, at least in part on a stored untrusted network access preference of the requesting service, and connecting, by the processor, the requesting service to a network via the selected connection gateway.

In some aspects, connecting, by the processor, the requesting service to the network via the selected connection gateway may include connecting the requested service to a 5GC network via a non-3GPP InterWorking Function (N3IWF) gateway or the like.

In some aspects, connecting, by the processor, the requesting service to the network via the selected connection gateway may include connecting the requested service to a untrusted non-3GPP network via a PDG gateway. In such aspects, the untrusted non-3GPP network may be EPC.

In an aspect, the present disclosure includes a method for identifying that a wireless communications device is 5G compatible, including inserting, by a processor of the wireless communications device, a 5G capability identifier into a payload, and transmitting, by a transceiver of the wireless communications device, the payload via an access network. In such aspects, inserting, by the processor of the wireless communications device, the 5G capability identifier into the payload may include inserting the 5G capability identifier as an Identification Payload Response (IPr), a header field, one or more bits, or an APN.

Moreover, the present disclosure also includes apparatus having components or configured to execute or means for executing the above-described methods, and computer-readable medium storing one or more codes executable by a processor to perform the above-described methods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
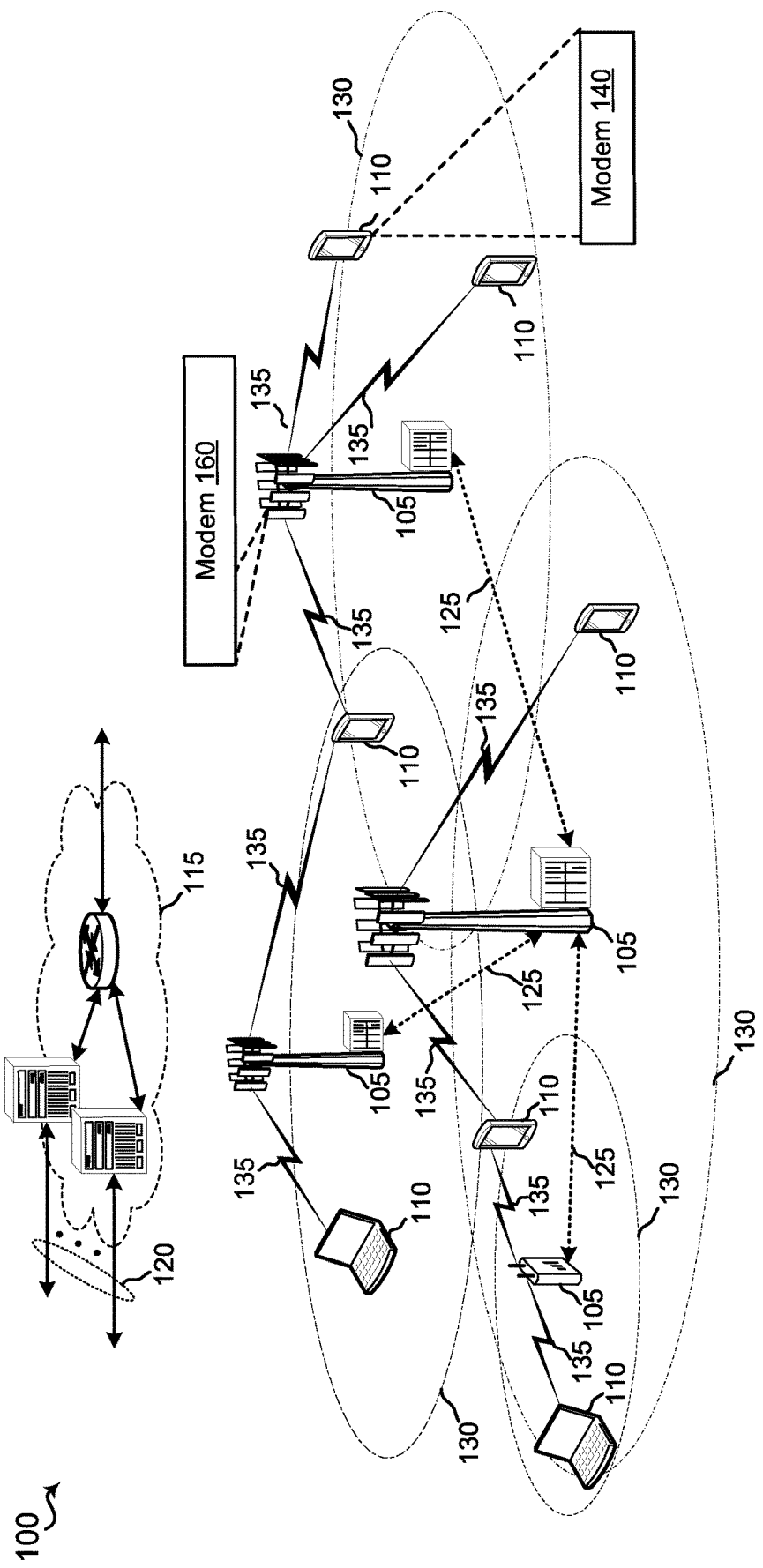
FIG. 1 is a schematic diagram of a wireless communication network including at least one user equipment (UE) configured according to this disclosure to select an access network connection gateway.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to methods and devices for enabling wireless communications devices to support services on one or more networks, such as a fifth generation (5G) core (5GC) network, an evolved packet core (EPC) network, etc., using different access networks, such as a non-third generation partnership project (3GPP) access network, 3GPP access network, and/or the like. The various aspects may enable a wireless communications device to select a connection gateway based on a service related to the network, based on preferences or prioritizations specified for a service, etc. In this regard, the wireless communication device can select certain connection gateways for certain types of service to facilitate using 3GPP or non-3GPP access networks for certain services provided in a 5GC (or EPC) network.

Various aspects may further enable the wireless communications device to provide a 5G capability identifier into a payload or data stream associated with a service, to inform a receiving base station or server that the requesting service may be supported on either 5GC or EPC and/or using a non-3GPP access network or a 3GPP access network. The various aspects may be advantageous in mixed access networks in which 5G may not be fully supported for all services, and/or a combination of non-3GPP and 3GPP access networks are available to a wireless communications device. Mixed access networks including 3GPP and non-3GPP networks may present problems for 5G capable wireless communications devices because utilizing entirely non-3GPP access networks may degrade device security, while using only 3GPP access networks may result in some services being unsupported, thereby possibly degrading the user experience. By enabling the wireless communications device to select the access network for supporting services and/or further enabling access network infrastructure to handover services between connection gateways without requiring additional input, the various aspects may improve the integrity of service connections, reducing dropped data, and/or improving the overall user experience in mixed access networks.

Additional features of the present aspects are described in more detail below with respect to FIGS. 1-11.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

As used herein, the terms "wireless communications device", "mobile device", "mobile computing device" and "user equipment" are used interchangeably and may refer to any computing device capable of communicating over a wireless access network. Examples may include but are not limited to smartphones, tablets, laptops, Internet-of-Things (IoT) devices, wearable computing devices, smart appliances, smart lightbulbs, smart clothing, smart glasses, and the like, as described further herein.

As used herein, the term "5G Access Network" refers to an access network comprising a NextGen (NG)-radio access network (RAN) and/or non-3GPP access network (AN) connecting to a 5G Core Network.

As used herein, "5G Core Network" refers to the core network connects to a 5G Access Network. The 5G Core Network may support the connectivity of the wireless communications device via non-3GPP access networks, e.g. wireless local area network (WLAN) access.

In various aspects, non-3GPP access networks can be connected to the 5G Core Network via a non-3GPP Inter-Working Function (N3IWF). The N3IWF interfaces to 5G Core Network control-plane functions and user-plane functions via N2 interface and N3 interface, respectively. The N2 and N3 reference points may be used to connect standalone non-3GPP accesses to 5G Core Network control-plane functions and user-plane functions respectively. In 5G Core Network implementations, the control-plane functions and user-plane functions may be separated.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example of a wireless communication network 100 includes at least one UE 110 with a modem 140. Further, wireless communication network 100 includes at least one base station 105.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

As described herein, a UE 110, e.g., via modem 140 and/or one or more other components, can be configured to determine a connection gateway for connecting to an access network via base station 105 to access a certain service related to a network. For example, the connection gateway can be selected based on the service related to the network available via base station 105, a stored network access preference, etc.

Figure 2:
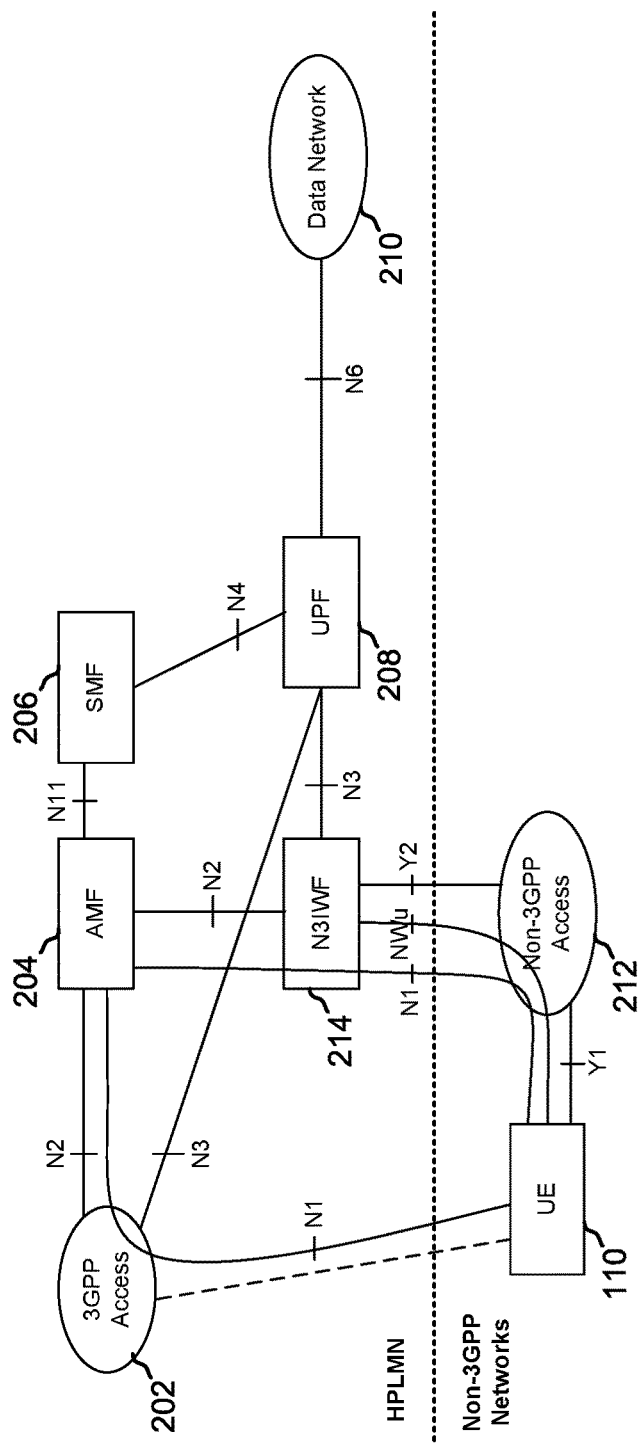
FIG. 2 is a schematic diagram illustrating a non-roaming system architecture for multiple access network connectivity according to various aspects.
Figure 3:
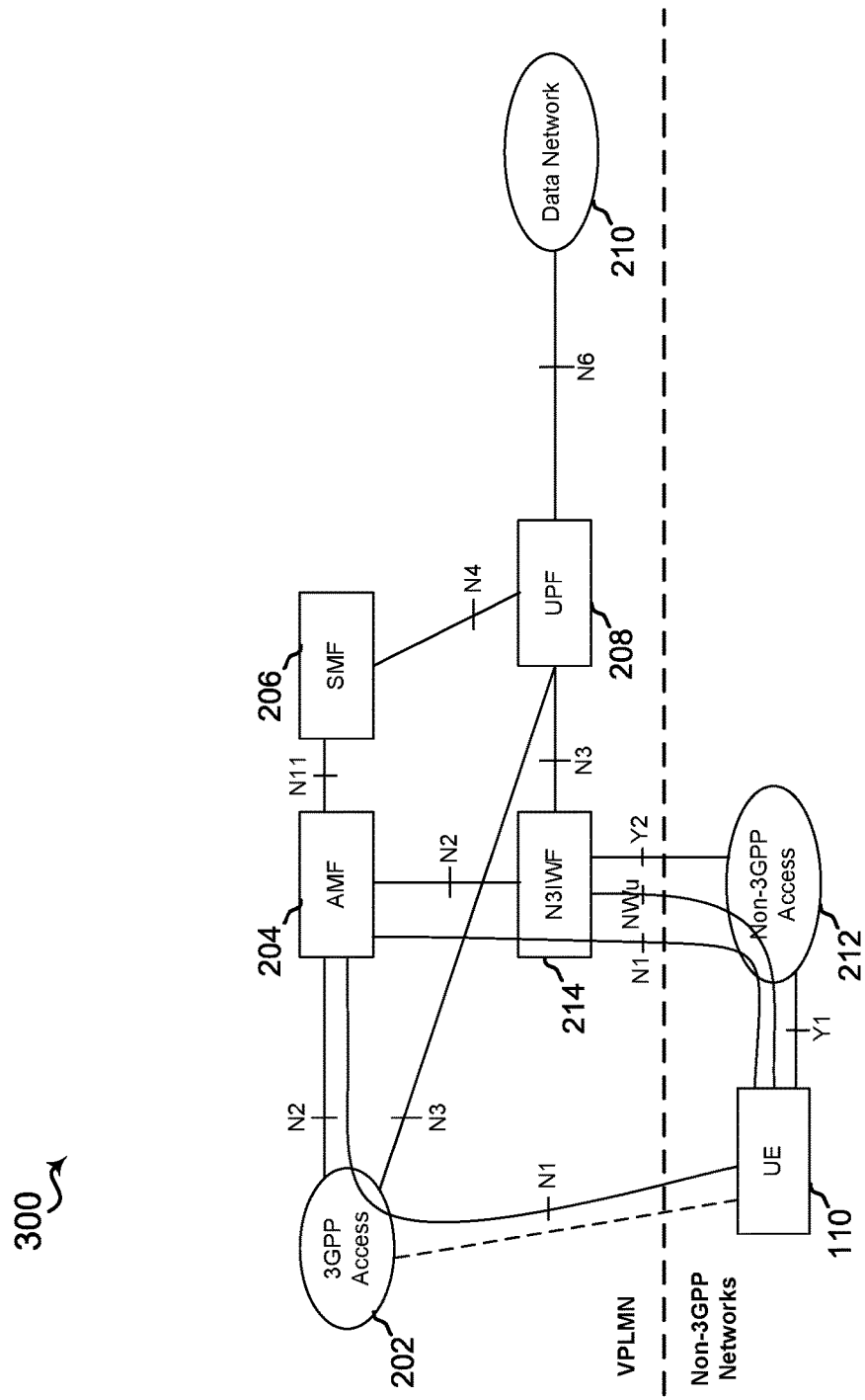
FIG. 3 is a schematic diagram illustrating a roaming system architecture for multiple access network connectivity according to various aspects.
Figure 4:
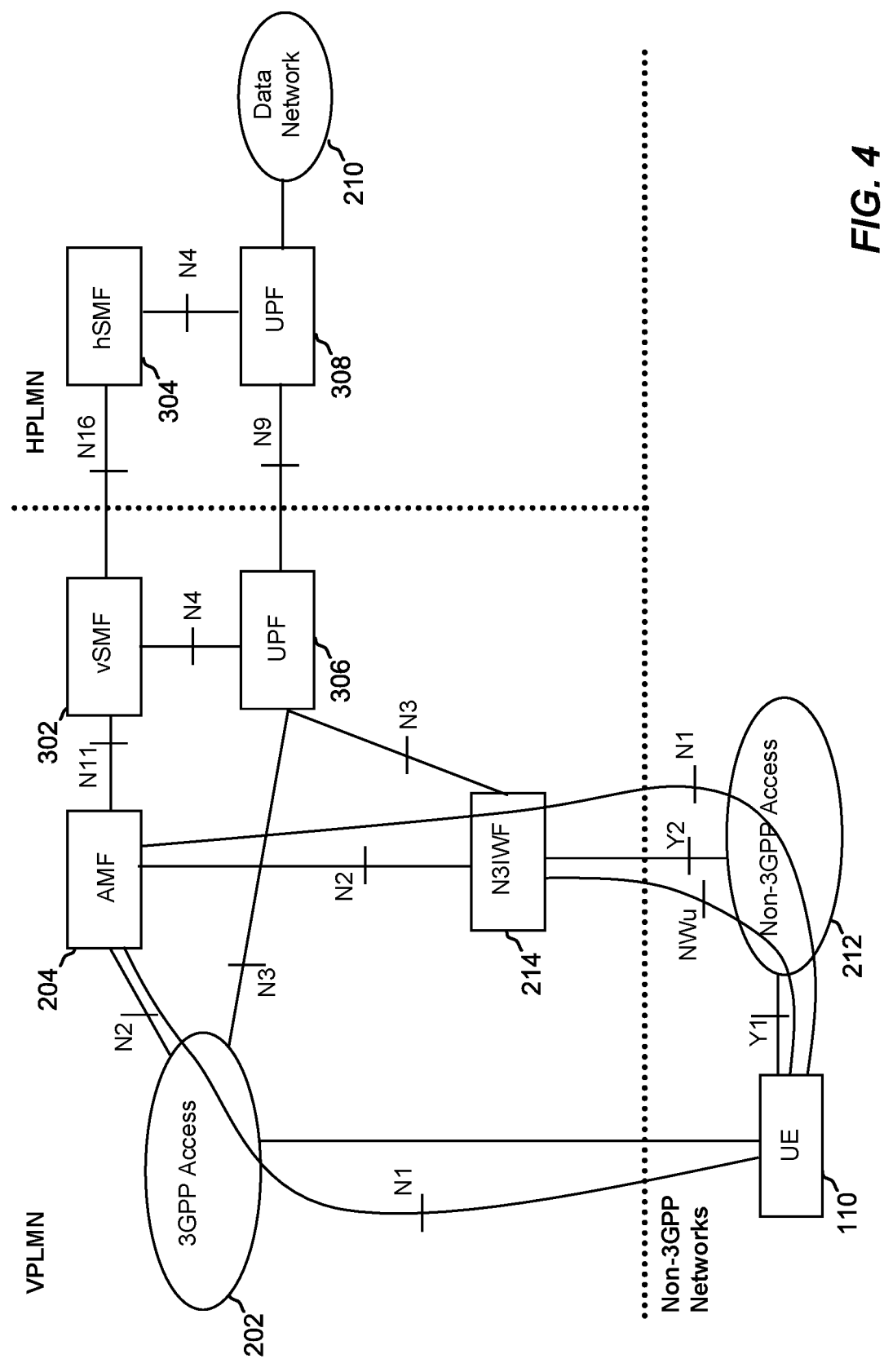
FIG. 4 is a schematic diagram illustrating a home routed roaming system architecture for multiple access network connectivity according to various aspects.

Referring to FIGS. 2-4 a wireless communications device (e.g., UE 110) may use a mixed access network architecture to support a number of device services. Mixed access network architectures 200, 300, and 400 illustrate examples of non-roaming, roaming, and home-routed architectures for implementing the various aspects.

In various aspects, a wireless communications device that accesses the 5G Core Network over a standalone non-3GPP access can, after attachment, support non-access stratum (NAS) signaling with 5G Core Network control-plane functions using the N1 reference point. When a wireless communications device is connected via a NG-RAN and via standalone non-3GPP accesses, multiple N1 instances can exist for the wireless communications device, i.e., there may be one N1 instance over NG-RAN and one N1 instance over non-3GPP access.

A wireless communications device simultaneously connected to the same 5G Core Network of a public land mobile network (PLMN) over 3GPP access and non-3GPP access may be served by a single access and mobility management function (AMF) if the selected N3IWF is located in the same PLMN as the 3GPP access.

When a wireless communications device is connected to a 3GPP access of a PLMN, if the wireless communications device selects the N3IWF and the N3IWF is located in a PLMN different from the PLMN of the 3GPP access (e.g. a different visited PLMN (VPLMN) or the home PLMN (HPLMN)) the wireless communications device may be served separately by the two PLMNs. The wireless communications device may be registered with two separate AMFs. Protocol data unit (PDU) sessions over the 3GPP access may be served by visited (V)-session management functions (SMFs) different from the V-SMF serving the PDU sessions over the non-3GPP access. The PLMN selection for the 3GPP access may not depend on the N3IWF selection. If a wireless communications device is registered over a non-3GPP, the wireless communications device may perform PLMN selection for the 3GPP access independently of the PLMN to which the N3IWF belongs.

A wireless communications device may establish an IPSec tunnel with the N3IWF to attach to the 5G Core Network over untrusted non-3GPP access. The wireless communications device may be authenticated by and attached to the 5G Core Network during the IPSec tunnel establishment procedure.

As illustrated in FIGS. 2-4, reference points specific to the non-3GPP access include Y1, a reference point between the UE 110 and the non-3GPP access (e.g. WLAN). This depends on the non-3GPP access technology and is outside the scope of 3GPP; Y2, a reference point between the non-3GPP access and the N3IWF for the transport of NWu traffic; and NWu, a reference point between the UE and N3IWF for establishing secure tunnel(s) between the UE and N3IWF so that control-plane and user-plane exchanged between the UE and the 5G Core Network is transferred securely over untrusted non-3GPP access.

Referring now to FIG. 2, there is illustrated a non-roaming architecture for 5G Core Network with non-3GPP access. The illustrated access network architecture 200 and the network functions can be directly connected to non-3GPP access. This architecture supports service based interfaces for AMF 204, SMF 206 and/or other NFs that may not be represented in the figure. In an example, access network architecture 200 may be or may include one or more components of a core network (e.g., core network 115) and/or of a radio access network (RAN). Access network architecture 200 includes 3GPP access 202, which may include one or more RAN nodes and/or other nodes, not explicitly shown, to facilitate 3GPP access of the UE 110 to the AMF 204 and/or other network components (e.g., one or more base stations, mobility management entity (MME), etc.). Access network architecture 200 may also include non-3GPP access 212, which may be a non-trusted access and may include one or more RAN nodes (e.g., a wireless local area network (WLAN) access point) to facilitate non-3GPP access of the UE 110 to the AMF 204 and/or other network components (e.g., via N3IWF 214). Moreover, access network architecture 200 may include a user plane function (UPF) 208 and/or a data network 210.

In various aspects, the two N2 instances may apply to a single AMF 204 for a wireless communications device, such as UE 110, which is simultaneously connected to the same 5G Core Network over 3GPP access 202 and non-3GPP access 212. Similarly, the two N3 instances may apply to different UPFs 208 when different PDU sessions are activated over 3GPP access 202 and non-3GPP access 212.

Referring now to FIG. 3, there is illustrated a roaming architecture for LBO for 5G Core Network with non-3GPP access (e.g., via a gateway with a N3IWF) in the VPLMN. The illustrated access network architecture 300 and the network functions can be directly connected to support non-3GPP access. The illustrated architecture supports service based interfaces for AMF 204, SMF 206, and/or other NFs that may not be represented in the figure.

In various aspects, the two N2 instances may apply to a single AMF 204 for a wireless communications device, such as UE 110, which is connected to the 5G Core Network over 3GPP access 202 and non-3GPP access 212 simultaneously. Similarly, the two N3 instances in may apply to different UPFs when different PDU sessions are activated over 3GPP access 202 and non-3GPP access 212.

Referring now to FIG. 4, there is illustrated a home-routed roaming architecture for 5G Core Network with non-3GPP access (e.g., via a gateway with a N3IWF) in the same VPLMN as 3GPP access. The illustrated home-routed access network architecture 400 and the network functions may be directly connected to support non-3GPP access. The two N2 instances may apply to a single AMF 204 for a UE 110 which is connected to the 5G Core Network over 3GPP access 202 and non-3GPP access 212 simultaneously. Access network architecture 400 may also include a vSMF 302 and UPF 306 of the VPLMN and a hSMF 304 and UPF 308 of the HPLMN.

Figure 5:
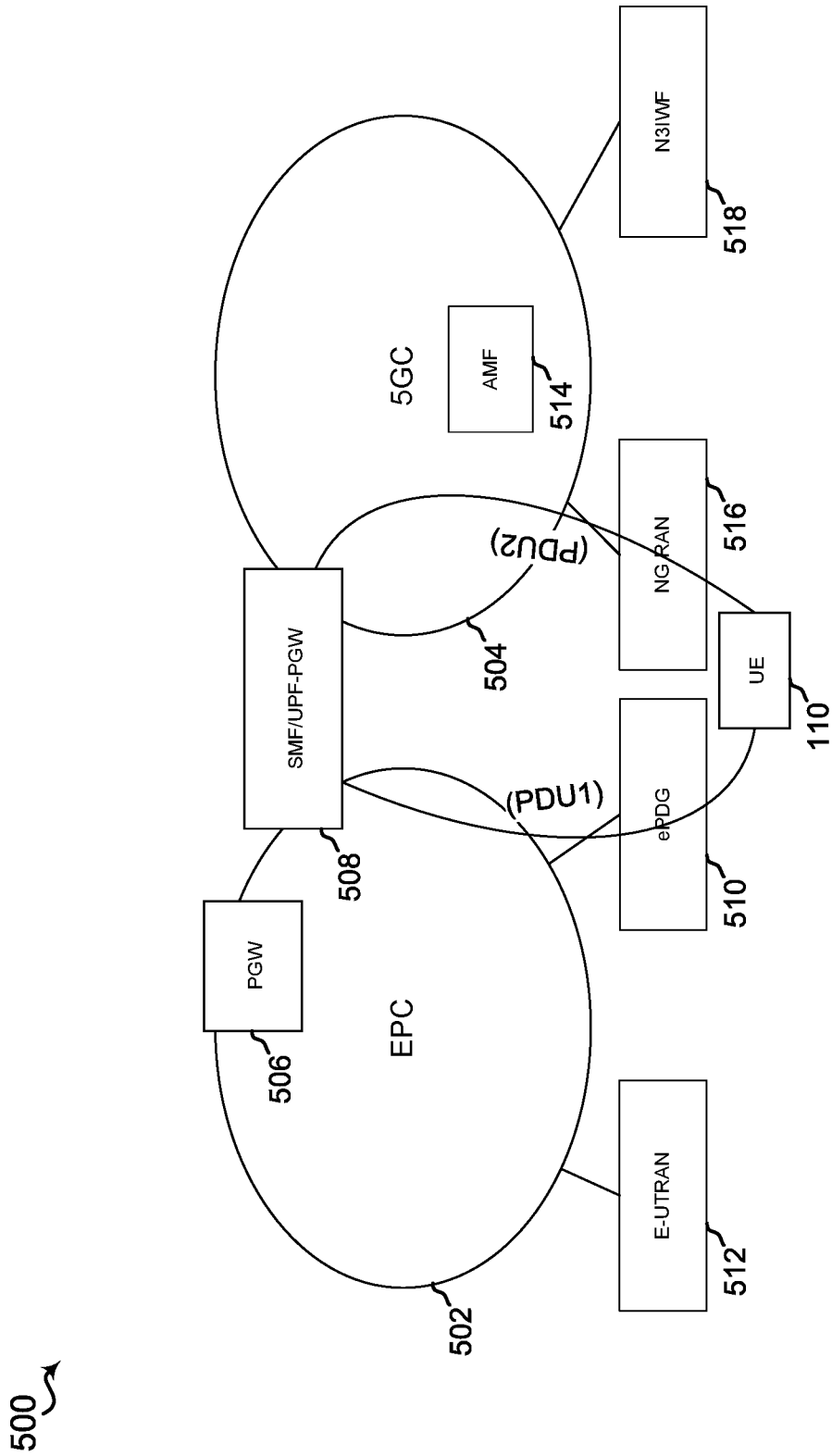
FIG. 5 is a schematic diagram illustrating wireless communications device connectivity through both trusted and untrusted access networks according to various aspects.

Referring to FIG. 5, a wireless communications device (e.g., UE 110) may use multiple access network architectures to support a number of device services via multiple core networks. Wireless communication system 500 illustrates example connectivity between both a 5GC and evolved packet core (EPC) using 3GPP and non-3GPP access networks.

With the migration from EPC, which is typically associated with 3GPP networks including LTE deployment, to 5GC and the NR deployment, an operator may decide to migrate services gradually. For example, an operator may decide to maintain voice over Internet Protocol (VoIP) services over EPC, and later migrate them to 5GC. Also, for example, an operator may decide to deploy in the 5GC services that are available in EPC (over both 3GPP access and via an evolved Packet Data Gateway (ePDG)) only over the 5G RAN, but not on new N3IWF deployments.

In such scenario, access via N3IWF to 5GC may not initially support VoIP. Therefore, if a wireless communications device is configured to support VoIP (e.g. use Internet Protocol (IP) Multimedia Subsystem (IMS) APN), the wireless communications device (e.g., UE 110) may prioritize the discovery of an ePDG (e.g., over a N3IWF) and establish a PDU session for VoIP via the ePDG to the EPC. For other scenarios (e.g., non-IMS APN), the wireless communication device (e.g., UE 110) may not prioritize discovery of an ePDG or may otherwise attempt to discover a N3IWF gateway (e.g., instead of or before ePDG attempts) to establish a session with a 5GC.

Various aspects may enable seamless mobility between connectivity to the EPC 502 or the 5GC 504. For example, a UE 110 can access the EPC 502 via ePDG 510 and connectivity to 5GC 504 via NG RAN 516. This may be beneficial when services already deployed in EPC 502 (including via ePDG 510) to 5GC 504 via NG RAN 516. In such aspects the wireless communications device, such as UE 110, may be connected via a 3GPP access to the EPC 502, and via N3IWF 518 to the 5GC 504. For example the wireless communications device, such as UE 110, may originally connect via NG-RAN 516 and/or N3IWF 518 to the 5GC 504, and then a handover from NG-RAN 516 to E-UTRAN 512 occurred. In such case, in fact, if WLAN coverage is available, there may be no technical reason for moving the PDU sessions via the N3IWF 518 to the EPC 502.

In an aspect, a 5G capable wireless communications device, such as UE 110, may connect first via E-UTRAN 512 to the EPC 502, but may be capable of discovering an N3IWF 518 and connecting to the 5GC 504 via N3IWF 518. Because the wireless communications device (e.g., UE 110) may be handed over to the NG-RAN 516, it may be beneficial to allow the wireless communications device to select an N3IWF 518 (if available) instead of limiting the wireless communications device to connect to an ePDG 510.

In another aspect, the PDN connection may be established in EPC 502 via an ePDG 510 by a 5GC capable wireless communications device, such as UE 110, with the ability to handover the PDN connection to the 5GC 504 when the wireless communications device hands over to a NG-RAN 516), the wireless communications device may adopt PGW selection a mechanism. For example, the wireless communications device (e.g., UE 110) upon PDN connection establishment via the ePDG 510, may provide an indication to the ePDG 510 that the wireless communications device is 5GC capable, so that the ePDG 510 performs SMF/PGW-C selection considering, in addition to the APN provided by the wireless communications device, also the ability of the wireless communications device to connect to the 5GC 504. Moreover, for example, EPC may include a PGW 506 that may facilitate access to a SMF/UPF-PGW 508 shared between, or otherwise communicatively coupled to both of, EPC 502 and 5GC 504. 5GC 504 may include an AMF 514 (e.g., for similar purposes) as well.

Figure 6:
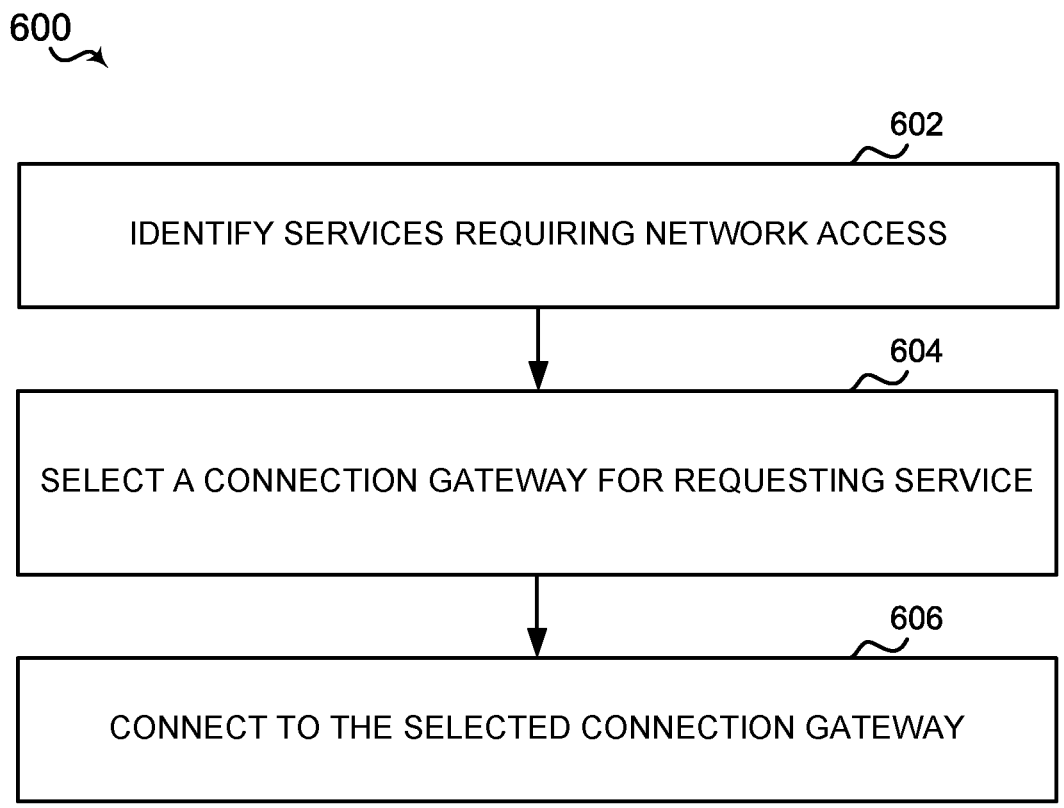
FIG. 6 is a flow diagram of an example of a method of selecting a connection gateway by a wireless communications device, according to various aspects.

Referring to FIG. 6 for example, a method 600 of wireless communication in operating a wireless communications device (e.g., UE 110) according to the above-described aspects to select a connection gateway for supporting services operating on the wireless communications device includes one or more of the herein-defined actions. A 5GC-capable wireless communications device configured to access non-3GPP access over either EPC or 5GC may select a gateway for connectivity to the network over a non-3GPP access.

For example, at block 602, services requiring network access can be identified. For example, a connectivity selection component 1250 (described in FIG. 10), e.g., in conjunction with processor 1212, transceiver 1202, etc. of the UE 110 may (optionally) identify the one or more services requiring network access (e.g., connection or access to one or more connection gateways). In an example, the one or more services may be identified as services corresponding to a certain data network name (DNN) or access point name (APN) and in which the APN can be identified based on a configured mapping between an application/service and the DNN or APN. In an example, the base station 105 can advertise one or more services (e.g., in a broadcast message) based on DNN, APN, etc., and the connectivity selection component 1250 can determine and/or select one or more services for requesting from the base station 105.

In block 604, a connection gateway for a requesting service may be selected (e.g., based at least in part on a stored network access preference). In an example, a connectivity selection component 1250 (described in FIG. 10), e.g., in conjunction with processor 1212, transceiver 1202, etc. of the UE 110, may select the connection gateway for requesting service. For example, the connectivity selection component 1250 may examine a stored network access preference and/or a capability of the device to determine whether the wireless communications device is configured to prioritize connectivity via an N3IWF/via 5GC or via EPC/via ePDG, etc. In various aspects, the stored network access preference may include, on a per DNN/APN/service/application, a configuration of whether priority is given to connectivity to 5GC or EPC, etc. In other aspects, the stored network access preference may include whether the service is available in EPC. In other aspects, the stored network access preference may include whether the service is available in 5GC.

In block 606, the selected connection gateway can be connected to. For example the a connectivity selection component 1250 (described in FIG. 10), e.g., in conjunction with processor 1212, transceiver 1202, etc. of the UE 110, may connect to the selected connection gateway, which may include discovering the type of connection gateway selected (e.g., N3IWF with respect to ePDG) and establishing connectivity to the discovered gateway. Further, if the selected type connection gateway is an N3IWF and no N3IWF is available, the connectivity selection component 1250 may discover an ePDG and attempt to connect to the ePDG.

Figure 7:
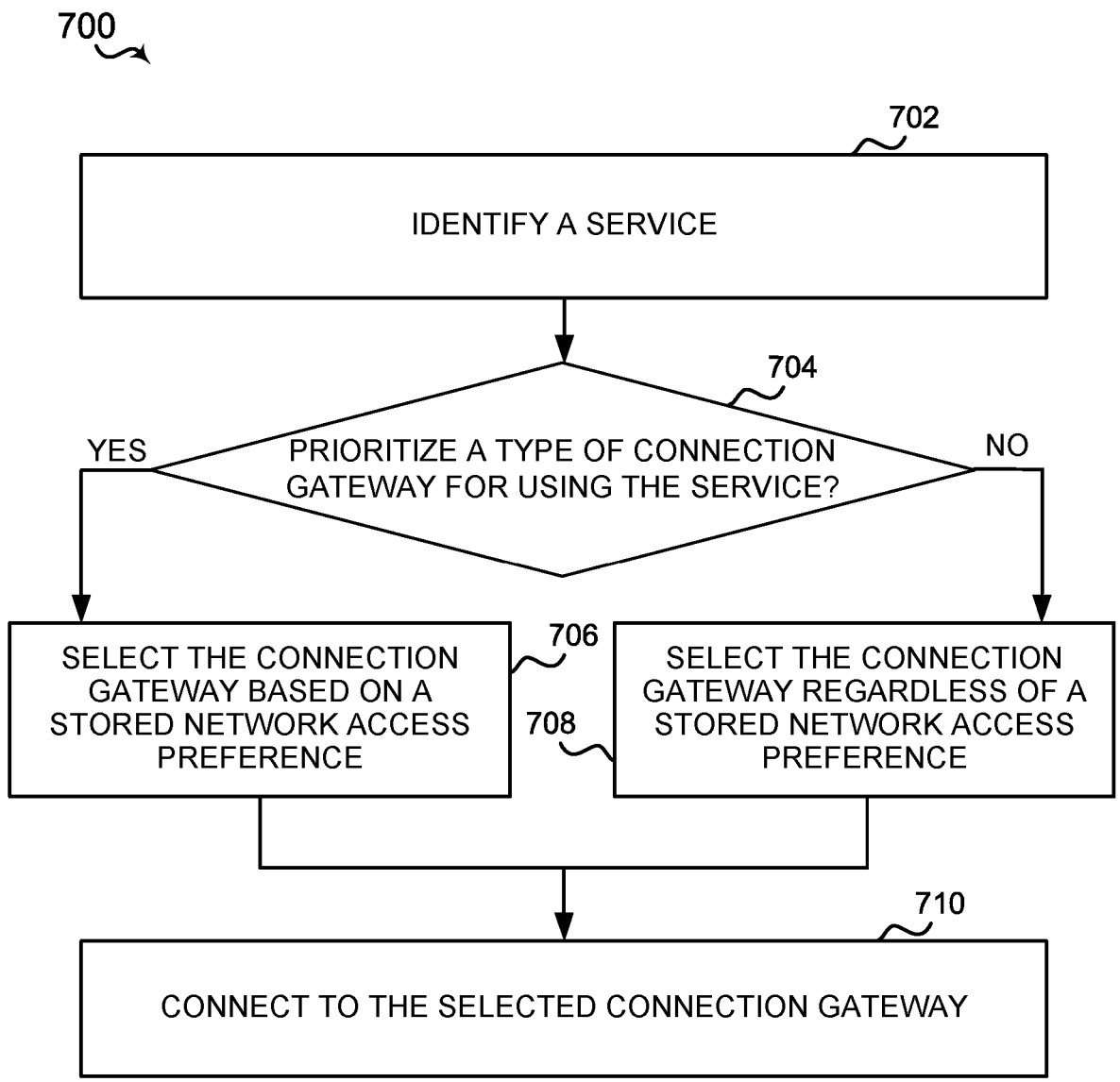
FIG. 7 is a flow diagram of an example of a method of determining whether to prioritize selection of a connection gateway by a wireless communications device, according to various aspects.

Referring to FIG. 7 for example, a method 700 of wireless communication in operating a wireless communications device (e.g., UE 110) according to the above-described aspects to select a connection gateway for supporting services operating on the wireless communications device includes one or more of the herein-defined actions.

For example, at block 702, a service can be identified. For example, a connectivity selection component 1250 (described in FIG. 10), e.g., in conjunction with processor 1212, transceiver 1202, etc. of the UE 110, may (optionally) identify the service. For example, the service may be specified for, or related to, a network or network access, and/or may require network access, as described herein. In an example, the one or more services may be identified as services corresponding to a certain DNN or APN, as described, and in which the APN can be identified based on a configured mapping between an application/service and the DNN or APN. In one example, the service may correspond to an IMS or non-IMS system. Whether the service relates to IMS or non-IMS can be determined based on the DNN or APN, based on an indicator in information received from the network regarding the service (e.g., in one or more broadcast messages from the network), and/or the like. For example, a base station 105 can advertise the service, and the UE 110 can determine to connect to the service based at least in part on detecting that the service is advertised by the base station 105, a list of services stored in the UE 110, etc. In addition, the UE 110 can determine to connect to the service based on a request from an application executing on the UE 110 (e.g., to a VoIP service based on a request from a VoIP application, etc.).

For example, at block 704, it can be determined whether to prioritize a type of connection gateway for using the service. For example, a connectivity selection component 1250 (described in FIG. 10), e.g., in conjunction with processor 1212, transceiver 1202, etc. of the UE 110, may (optionally) determine whether to prioritize the type of connection gateway (and/or a specific connection gateway) for using the service. For example, this can be determined based on the service identified as related to the network and/or as determined by the UE 110 to utilize in communicating with the network. In one example, whether to prioritize the type of connection gateway can include determining whether to prioritize the type of connection gateway over another type of connection gateway. For example, this can include determining to prioritize a connection gateway using non-3GPP access for certain types of services (e.g., services related to an IMS), determining not to prioritize the type of connection gateway using non-3GPP access for other types of services (e.g., services not related to IMS), etc. In another example, determining whether to prioritize the type of connection gateway using the non-3GPP access can include determining whether, for the determined service, type of service (e.g., IMS, non-IMS, etc.), and/or the like, the UE 110 is configured to select a connection gateway in non-3GPP access configurations. If so, for example, the connectivity selection component 1250 can select the connection gateway based on a stored network access preference at least for certain types of services and/or based on a type of the connection gateway.

For example, where it is determined, at block 704, to prioritize a type of connection gateway, method 700 can include, at block 706, selecting the connection gateway based on a stored network access preference. For example, a connectivity selection component 1250 (described in FIG. 10), e.g., in conjunction with processor 1212, transceiver 1202, etc. of the UE 110, may (optionally) select the connection gateway based on the stored network access preference and/or based on a type of the connection gateway where it determines to select the connection gateway for the service using the non-3GPP access. As described, this can include determining that the UE 110 is configured to prioritize connectivity in non-3GPP access configurations for certain types of services (e.g., services related to an IMS). Moreover, as described, the UE 110 can store the stored network access preference (e.g., in a memory, such as memory 1216) indicating a preference for one or more types of connection gateway (e.g., ePDG, N3IWF gateway, etc.), a ranked list of preferred types of connection gateways, etc. Thus, the connectivity selection component 1250 may attempt to connection to the preferred type of connection gateway, may attempt connection to one or more connection gateways according to the ranked list of preferred types, etc. Moreover, as described in an example, the stored network access preference(s) may be indicated per DNN and/or APN, per service or type of service, network or type of network, and/or the like, and the connectivity selection component 1350 may determine the appropriate preference(s) to apply in selecting the connection gateway based on the service, corresponding DNN/APN, network, etc.

In a specific example, selecting the connection gateway at 706 may include discovering the type of connection gateway selected (e.g., N3IWF wrt ePDG) and establishing connectivity to the discovered gateway, if any, and/or if the selected or preferred type of connection gateway is an N3IWF and no N3IWF gateway is available, discovering an ePDG and attempting to connect to the ePDG. Thus, for example, where a gateway corresponding to the stored network access preference is not available, the connectivity selection component 1250 may select another type of connection gateway, at least in some examples. In other examples, the connectivity selection component 1250 may not select a connection gateway and/or may return an error in a process to connect to the network. In another example, where a gateway corresponding to the stored network access preference is not available, the connectivity selection component 1250 may attempt connection in a different network (e.g., to another connection gateway in the different network).

For example, where it is determined, at block 704, to not prioritize a type of connection gateway, method 700 can include, at block 708, selecting the connection gateway regardless of a stored network access preference. For example, a connectivity selection component 1250 (described in FIG. 10), e.g., in conjunction with processor 1212, transceiver 1202, etc. of the UE 110, may (optionally) select the connection gateway regardless of the stored network access preference where it determines to not select the type of connection gateway for the service using the non-3GPP access. As described, this can include determining that the UE 110 is not configured to prioritize connectivity in non-3GPP access configurations for certain types of services (e.g., services related to a non-IMS). In this example, the UE 110 can attempt connection to a certain type of connection gateway regardless of the stored network access preference. For example, the UE 110 can attempt connection to a N3IWF gateway where it determines to not prioritize the connection gateway for the service using the non-3GPP access. In addition, the UE 110 can attempt connection to other types of connection gateways (e.g., ePDG) where connection to the first gateway (e.g., a N3IWF gateway) fails.

In either case, at block 710, the selected connection gateway can be connected to. For example, a connectivity selection component 1250 (described in FIG. 10), e.g., in conjunction with processor 1212, transceiver 1202, etc. of the UE 110, may (optionally) connect to the selected connection gateway. In an example, the connectivity selection component 1250 may transmit a request to connect to the selected connection gateway via one or more RAN nodes and/or nodes of the corresponding core network (e.g., EPC, 5GC, etc.).

Figure 8:
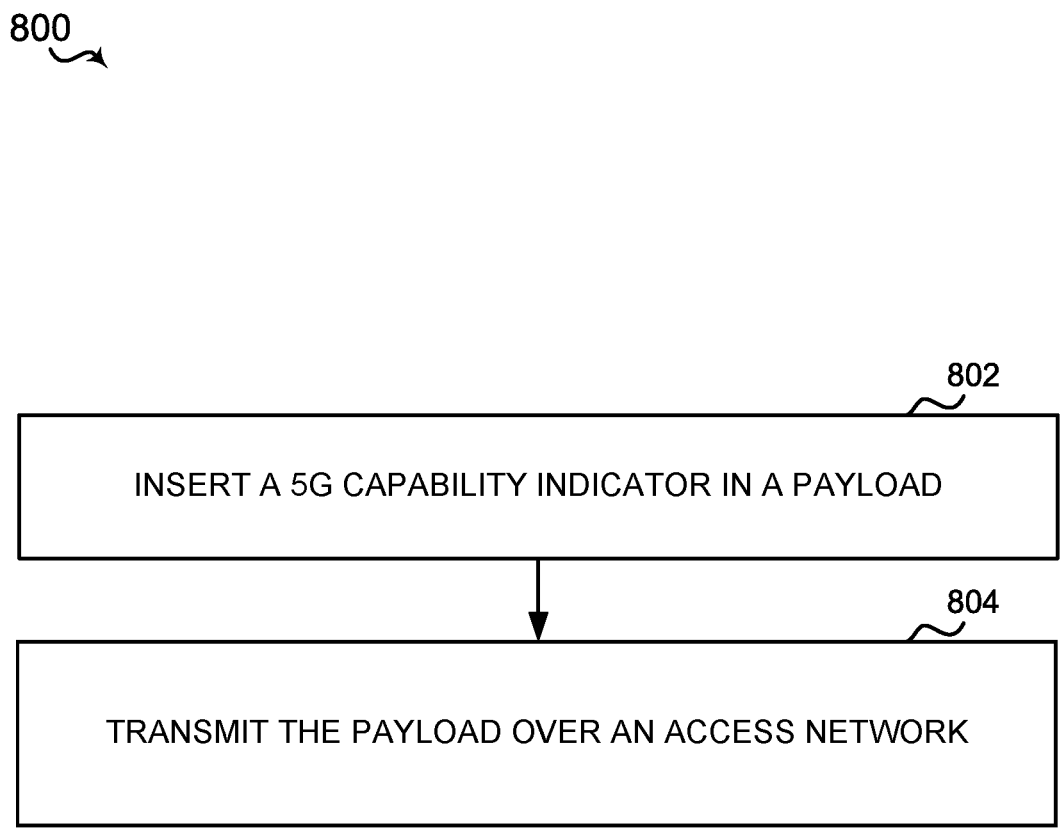
FIG. 8 is a flow diagram of an example of a method of identifying that a wireless communications device is 5G capable, according to various aspects.

Referring to FIG. 8 for example, a method 800 of wireless communication in operating a wireless communications device (e.g., UE 110) according to the above-described aspects to indicate whether the wireless communications device has 5G capability can include one or more of the herein-defined actions. A 5GC capable wireless communications device, such as a UE 110, when establishing connectivity to a data network (identified by an APN) may provide an indication of whether the wireless communications device is 5GC capable.

For example, in block 802 a 5G capability indicator can be inserted in a payload. For example, a connectivity selection component 1250 (described in FIG. 10), e.g., in conjunction with processor 1212, transceiver 1202, etc. of the UE 110, may insert the 5G capability indicator into the payload. In various aspects, the wireless communications device may provide the 5GC capability indication in the same information element in which the wireless communications device provides the APN identifying the data network, i.e. the IKEv2 Identification Payload Response (IDr).

In various aspects, the 5G capability indicator may alternatively include a new Identification Type Field value for the IDr payload, (e.g. UE Capability, and set to a value "5GC"). The wireless communications device may provide an IDr payload for the APN and an additional IDr payload for the wireless communications device capability. In other aspects, the 5G capability indicator may include a specific bit or combination of bits in the ID_KEY_ID Identification Type Field of the IDr payload to provide the wireless communications device capability indication. In other aspects, the 5G capability indicator may be encoded together with the APN by adding a marked indication for 5GC, e.g. if the APN is "Internet-4. apn.epc.mnc111.mcc222.3gppnetwork.org" then the marked APN with 5GC indication can be "Internet-4.5GC.apn.epc.mnc111.mcc222.3gppnetwork.org". In other aspects, the 5G capability indicator may be encoded together with the APN by performing network address identifier (NAI) decoration, by adding an indication 5GC, e.g. if the APN is "Internet-4.5GC.apn.epc.mnc111.mcc222.3gppnetwork.org", then the decorated NAI may be "5GC.Internet-4.apn.epc.mnc111.mcc222.3 gppnetwork.org" or "5GC@Internet-4.apn.epc.mnc111.mcc222.3gppnetwork.org".

In block 804, the payload may be transmitted over an access network. For example, a connectivity selection component 1250 (described in FIG. 10), e.g., in conjunction with processor 1212, transceiver 1202, etc. of the UE 110, may transmit the payload over the access network (e.g., the selected data network). In so doing, the wireless communications device may indicate to the receiving network node that the transmitting device is 5G capable and thus its services may be handed over from a non-3GPP access network to a 5G access network as needed.

Figure 9:
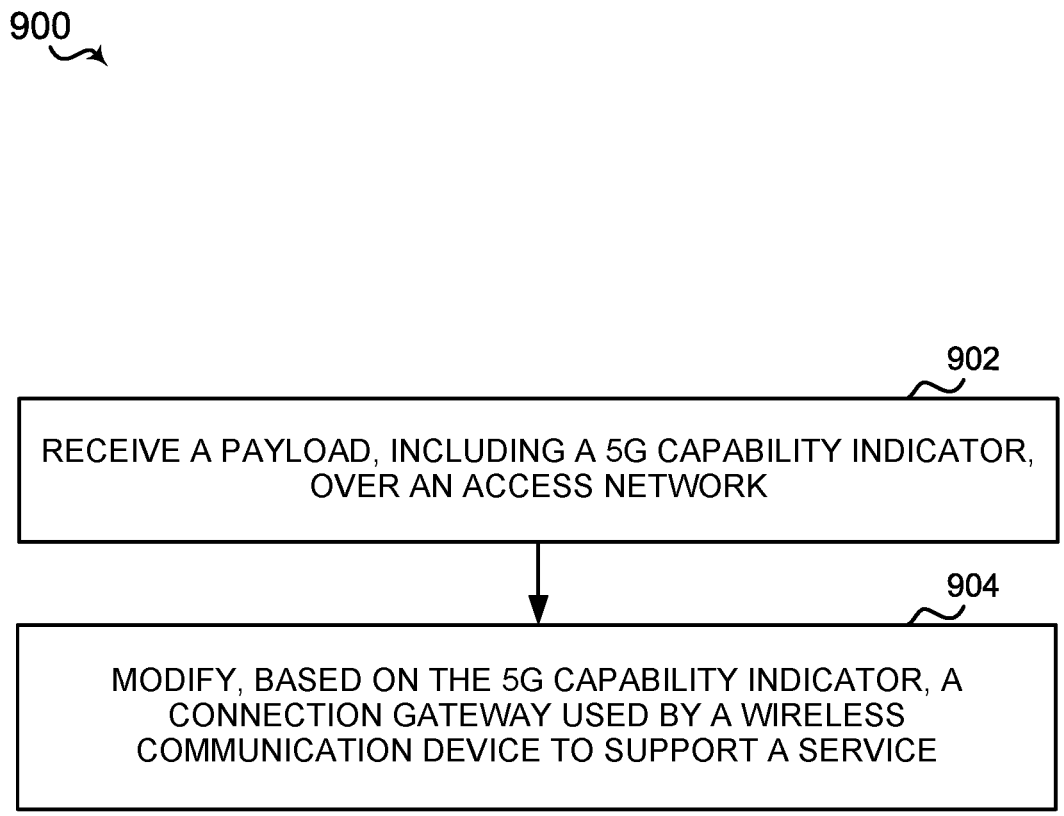
FIG. 9 is a flow diagram of an example of a method of determining a connection gateway for a 5G-capable wireless communications device, according to various aspects.

Referring to FIG. 9 for example, a method 900 of wireless communication in operating a wireless communications device (e.g., base station 105) according to the above-described aspects to receive an indication of whether a UE 110 has 5G capability can include one or more of the herein-defined actions.

For example, in block 902 a payload, including a 5G capability indicator, can be received over an access network. For example, a connectivity selection component 1350 (described in FIG. 11), e.g., in conjunction with processor 1312, transceiver 1302, etc. of the base station 105, may receive the payload, including the 5G capability indicator, over the access network. For example, the connectivity selection component 1350 can receive the payload from a UE 110 to indicate whether the UE 110 is capable of supporting 5G communications, related services, etc., as described above in reference to FIG. 8.

For example, in block 904 a connection gateway used by a wireless communication device (e.g., UE 110) to support a service can be modified based on the 5G capability indicator. For example, a connectivity selection component 1350 (described in FIG. 11), e.g., in conjunction with processor 1312, transceiver 1302, etc. of the base station 105, may modify, based on the 5G capability indicator, the connection gateway used by the wireless communication device (e.g., UE 110) to support the service. For example, the connectivity selection component 1350 can select a connection gateway to include a 5G gateway (e.g., a N3IWF gateway) where the 5G capability indicator indicates that the UE 110 can support 5G. In an example, the connectivity selection component 1350 can select the connection gateway at least in part by facilitating communications between the UE 110 and the selected connection gateway to provide the service requested by the UE 110.

Figure 10:
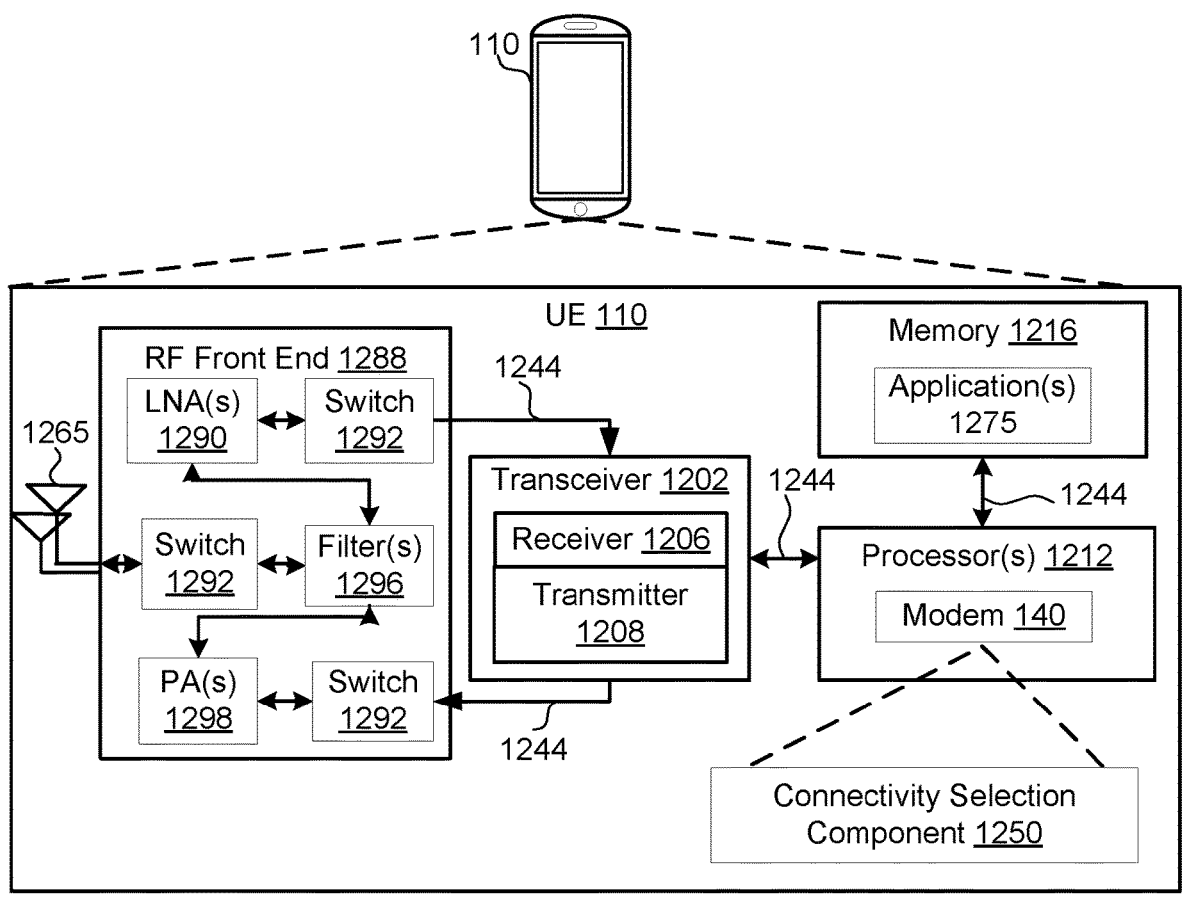
FIG. 10 is a schematic diagram of example components of the UE of FIG. 1.

Referring to FIG. 10, one example of an implementation of UE 110 may include a variety of components, some of which have already been described above, but including components such as one or more processors 1212 and memory 1216 and transceiver 1202 in communication via one or more buses 1244, which may operate in conjunction with modem 140. Further, the one or more processors 1212, modem 140, memory 1216, transceiver 1202, RF front end 288 and one or more antennas 286, may be configured to support voice and/or data calls (simultaneously or non-simultaneously) in one or more radio access technologies.

In an aspect, the one or more processors 1212 can include a modem 140 that uses one or more modem processors. The various functions may be included in modem 140 and/or processors 1212 and, in an aspect, can be executed by a single processor, while in other aspects, different ones of the functions may be executed by a combination of two or more different processors. For example, in an aspect, the one or more processors 1212 may include any one or any combination of a modem processor, or a baseband processor, or a digital signal processor, or a transmit processor, or a receiver processor, or a transceiver processor associated with transceiver 1202. In other aspects, some of the features of the one or more processors 1212 and/or modem 140 associated with the connectivity selection component 1250 may be performed by transceiver 1202.

Also, memory 1216 may be configured to store data used herein and/or local versions of applications 1275 being executed by at least one processor 1212. Memory 1216 can include any type of computer-readable medium usable by a computer or at least one processor 1212, such as random access memory (RAM), read only memory (ROM), tapes, magnetic discs, optical discs, volatile memory, non-volatile memory, and any combination thereof. In an aspect, for example, memory 1216 may be a non-transitory computer-readable storage medium that stores one or more computer-executable codes defining and/or data associated therewith.

Transceiver 1202 may include at least one receiver 1206 and at least one transmitter 1208. Receiver 1206 may include hardware, firmware, and/or software code executable by a processor for receiving data, the code comprising instructions and being stored in a memory (e.g., computer-readable medium). Receiver 1206 may be, for example, a radio frequency (RF) receiver. In an aspect, receiver 1206 may receive signals transmitted by at least one base station 105. Additionally, receiver 1206 may process such received signals, and also may obtain measurements of the signals, such as, but not limited to, Ec/Io, SNR, RSRP, RSSI, etc. Transmitter 1208 may include hardware, firmware, and/or software code executable by a processor for transmitting data, the code comprising instructions and being stored in a memory (e.g., computer-readable medium). A suitable example of transmitter 1208 may including, but is not limited to, an RF transmitter.

Moreover, in an aspect, UE 110 may include RF front end 1288, which may operate in communication with one or more antennas 1265 and transceiver 1202 for receiving and transmitting radio transmissions, for example, wireless communications transmitted by at least one base station 105 or wireless transmissions transmitted by UE 110. RF front end 1288 may be connected to one or more antennas 1265 and can include one or more low-noise amplifiers (LNAs) 1290, one or more switches 1292, one or more power amplifiers (PAs) 1298, and one or more filters 1296 for transmitting and receiving RF signals.

In an aspect, LNA 1290 can amplify a received signal at a desired output level. In an aspect, each LNA 1290 may have a specified minimum and maximum gain values. In an aspect, RF front end 1288 may use one or more switches 1292 to select a particular LNA 1290 and its specified gain value based on a desired gain value for a particular application.

Further, for example, one or more PA(s) 1298 may be used by RF front end 1288 to amplify a signal for an RF output at a desired output power level. In an aspect, each PA 1298 may have specified minimum and maximum gain values. In an aspect, RF front end 1288 may use one or more switches 1292 to select a particular PA 1298 and its specified gain value based on a desired gain value for a particular application.

Also, for example, one or more filters 1296 can be used by RF front end 1288 to filter a received signal to obtain an input RF signal. Similarly, in an aspect, for example, a respective filter 1296 can be used to filter an output from a respective PA 1298 to produce an output signal for transmission. In an aspect, each filter 1296 can be connected to a specific LNA 1290 and/or PA 1298. In an aspect, RF front end 1288 can use one or more switches 1292 to select a transmit or receive path using a specified filter 1296, LNA 1290, and/or PA 1298, based on a configuration as specified by transceiver 1202 and/or processor 1212.

As such, transceiver 1202 may be configured to transmit and receive wireless signals through one or more antennas 1265 via RF front end 1288. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 1202 to operate at a specified frequency and power level based on the UE configuration of the UE 110 and the communication protocol used by modem 140.

In an aspect, modem 140 can be a multiband-multimode modem, which can process digital data and communicate with transceiver 1202 such that the digital data is sent and received using transceiver 1202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 1288, transceiver 1202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

The modem 140 and/or processor 1212 can include the connectivity selection component 1250 that can include one or more subcomponents to perform aspects of the methods described in FIGS. 6-8.

Figure 11:
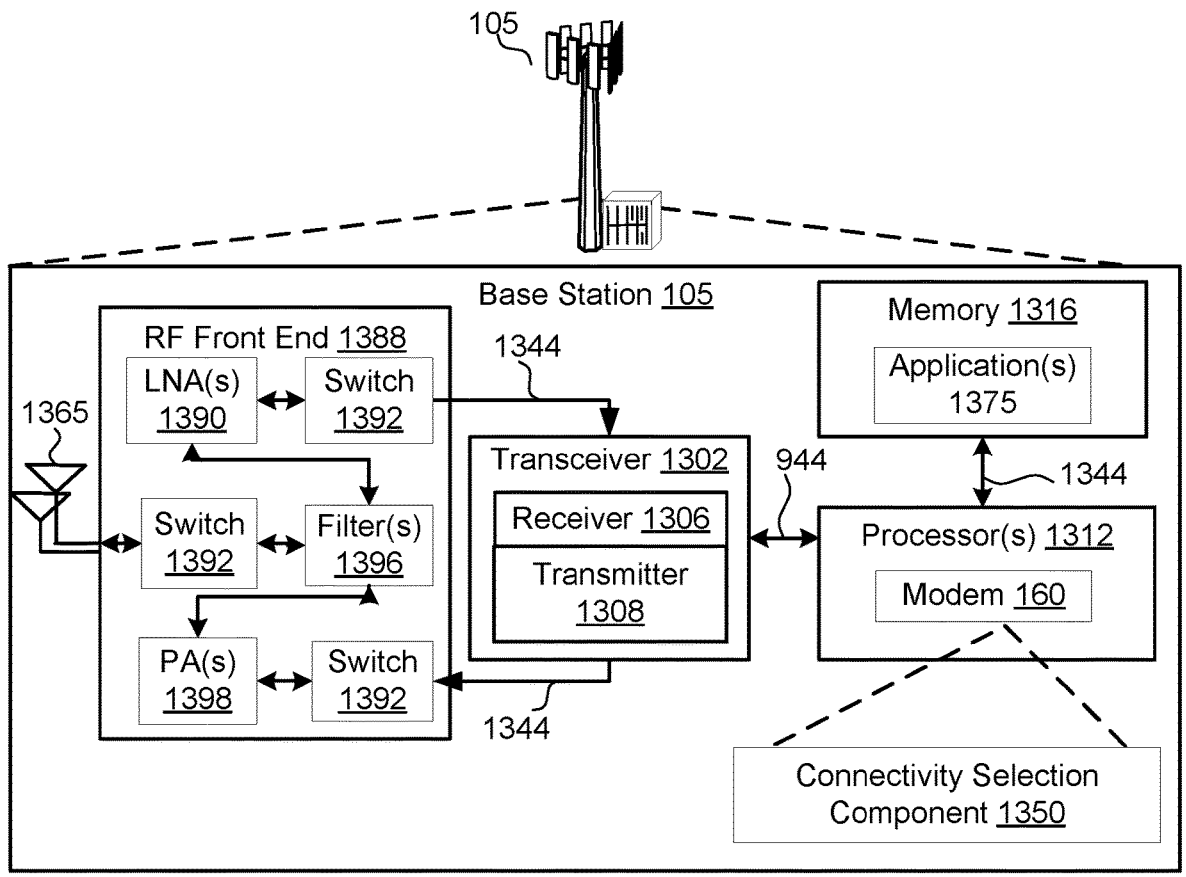
FIG. 11 is a schematic diagram of example components of the base station of FIG. 1.

Referring to FIG. 11, one example of an implementation of base station 105 may include a variety of components, some of which have already been described above, but including components such as one or more processors 1312 and memory 1316 and transceiver 1302 in communication via one or more buses 1344, which may operate in conjunction with modem 160.

The transceiver 1302, receiver 1306, transmitter 1308, one or more processors 1312, memory 1316, applications 1375, buses 1344, RF front end 1388, LNAs 1390, switches 1392, filters 1396, PAs 1398, and one or more antennas 1365 may be the same as or similar to the corresponding components of UE 110, as described above, but configured or otherwise programmed for base station operations as opposed to UE operations.

The modem 160 and/or processor 1312 can include the connectivity selection component 1350 that can include one or more subcomponents to perform aspects of the methods described in FIG. 9.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, the method comprising:
   by a processor of a wireless communications device:
      obtaining an indication of a network-specific preference for non-Third Generation Partnership Project (non-3GPP) access between a first non-3GPP access via an evolved Packet Data Gateway (ePDG) and a second non-3GPP access via a non-3GPP InterWorking Function (N3IWF);
      based at least in part on a first service being an Internet Protocol Multimedia Subsystem (IMS) service and based at least in part on the indication of the network-specific preference for non-3GPP-access between the first non-3GPP access via an evolved Packet Data Gateway (ePDG) and the second non-3GPP access via a non-3GPP InterWorking Function (N3IWF), attempting to connect to the first service, which is an IMS service, via the network-specific preference for non-3GPP-access; and
      based at least in part on a second service being a non-IMS service, attempting to connect to the second service, which is a non-IMS service, via a non-3GPP-access other than the network-specific preference for non-3GPP-access.

2. The method of claim 1, further comprising:
   determining whether the first service is an IMS service or a non-IMS service; and
   determining whether the second service is an IMS service or a non-IMS service.

3. The method of claim 1, wherein the network-specific preference for non-3GPP-access is the first non-3GPP access via the ePDG; and
   wherein the non-3GPP-access other than the network-specific preference for non-3GPP-access is the second non-3GPP access via the N3IWF.

4. The method of claim 1, wherein attempting to connect to the second service via the non-3GPP-access other than the network-specific preference for non-3GPP-access, comprises:
   attempting to connect to the second service via the second non-3GPP access via the N3IWF; and wherein the method further comprises:
   after attempting to connect to the second service via the second non-3GPP access via the N3IWF, attempting to connect to the second service via the first non-3GPP access via the ePDG.

5. An apparatus for wireless communication, the apparatus comprising:
   a memory; and
   one or more processors coupled with the memory, wherein the one or more processors and memory are configured to:

obtain an indication of a network-specific preference for non-Third Generation Partnership Project (non-3GPP) access between a first non-3GPP access via an evolved Packet Data Gateway (ePDG) and a second non-3GPP access via a non-3GPP InterWorking Function (N3IWF);

based at least in part on a first service being an Internet Protocol Multimedia Subsystem (IMS) service and based at least in part on the indication of the network-specific preference for non-3GPP-access between the first non-3GPP access via an evolved Packet Data Gateway (ePDG) and the second non-3GPP access via a non-3GPP InterWorking Function (N3IWF), attempt to connect to the first service, which is an IMS service, via the network-specific preference for non-3GPP-access; and based at least in part on a second service being a non-IMS service, attempt to connect to the second service, which is a non-IMS service, via a non-3GPP-access other than the network-specific preference for non-3GPP-access.

6. The apparatus of claim 5, wherein the network-specific preference for non-3GPP-access is the first non-3GPP access via the ePDG; and wherein the non-3GPP-access other than the network-specific preference for non-3GPP-access is the second non-3GPP access via the N3IWF.

7. The apparatus of claim 5, wherein the one or more processors and memory are further configured to:

determine whether the first service is an IMS service or a non-IMS service; and determine whether the second service is an IMS service or a non-IMS service.

8. The apparatus of claim 5, wherein, to attempt to connect to the second service via the non-3GPP-access other than the network-specific preference for non-3GPP-access, the one or more processors and memory are configured to:

attempt to connect to the second service via the second non-3GPP access via the N3IWF; and wherein the one or more processors and memory are further configured to:

after attempting to connect to the second service via the second non-3GPP access via the N3IWF, attempt to connect to the second service via the first non-3GPP access via the ePDG.

9. An apparatus for wireless communication, the apparatus comprising:

means for obtaining an indication of a network-specific preference for non-Third Generation Partnership Project (non-3GPP) access between a first non-3GPP access via an evolved Packet Data Gateway (ePDG) and a second non-3GPP access via a non-3GPP InterWorking Function (N3IWF);

means for, based at least in part on a first service being an Internet Protocol Multimedia Subsystem (IMS) service and based at least in part on the indication of the network-specific preference for non-3GPP-access between the first non-3GPP access via an evolved Packet Data Gateway (ePDG) and the second non-3GPP access via a non-3GPP InterWorking Function (N3IWF), attempting to connect to the first service, which is an IMS service, via the network-specific preference for non-3GPP-access; and means for, based at least in part on a second service being a non-IMS service, attempting to connect to the second service, which is a non-IMS service, via a non-3GPP-access other than the network-specific preference for non-3GPP-access.

10. The apparatus of claim 9, wherein the network-specific preference for non-3GPP-access is the first non-3GPP access via the ePDG; and wherein the non-3GPP-access other than the network-specific preference for non-3GPP-access is the second non-3GPP access via the N31WF.

11. The apparatus of claim 9, further comprising:

means for determining whether the first service is an IMS service or a non-IMS service; and means for determining whether the second service is an IMS service or a non-IMS service.

12. The apparatus of claim 9, wherein the means for attempting to connect to the second service via the non-3GPP-access other than the network-specific preference for non-3GPP-access, comprises:

means for attempting to connect to the second service via the second non-3GPP access via the N3IWF; and wherein the apparatus further comprises:

means for, after attempting to connect to the second service via the second non-3GPP access via the N3IWF, attempting to connect to the second service via the first non-3GPP access via the ePDG.

13. A non-transitory computer-readable medium, comprising code executable by one or more processors for wireless communication, the code comprising:

code configured to obtain an indication of a network-specific preference for non-Third Generation Partnership Project (non-3GPP) access between a first non-3GPP access via an evolved Packet Data Gateway (ePDG) and a second non-3GPP access via a non-3GPP InterWorking Function (N3IWF);

code configured to, based at least in part on a first service being an Internet Protocol Multimedia Subsystem (IMS) service and based at least in part on the indication of the network-specific preference for non-3GPP-access between the first non-3GPP access via an evolved Packet Data Gateway (ePDG) and the second non-3GPP access via a non-3GPP InterWorking Function (N3IWF), attempt to connect to the first service, which is an IMS service, via the network-specific preference for non-3GPP-access; and code configured to, based at least in part on a second service being a non-IMS service, attempt to connect to the second service, which is a non-IMS service, via a non-3GPP-access other than the network-specific preference for non-3GPP-access.

14. The non-transitory computer-readable medium of claim 13, wherein the network-specific preference for non-3GPP-access is the first non-3GPP access via the ePDG; and wherein the non-3GPP-access other than the network-specific preference for non-3GPP-access is the second non-3GPP access via the N3IWF.

15. The non-transitory computer-readable medium of claim 13, wherein the code executable by the one or more processors for wireless communication further comprises:

code configured to determine whether the first service is an IMS service or a non-IMS service; and code configured to determine whether the second service is an IMS service or a non-IMS service.

16. The non-transitory computer-readable medium of claim 13, wherein, the code configured to attempt to connect to the second service via the non-3GPP-access other than the network-specific preference for non-3GPP-access, comprises:
- code configured to attempt to connect to the second service via the second non-3GPP access via the N3IWF; and wherein the code executable by the one or more processors for wireless communication further comprises:
- code configured to, after attempting to connect to the second service via the second non-3GPP access via the N3IWF, attempt to connect to the second service via the first non-3GPP access via the ePDG.

\* \* \* \* \*